Patented June 12, 1951

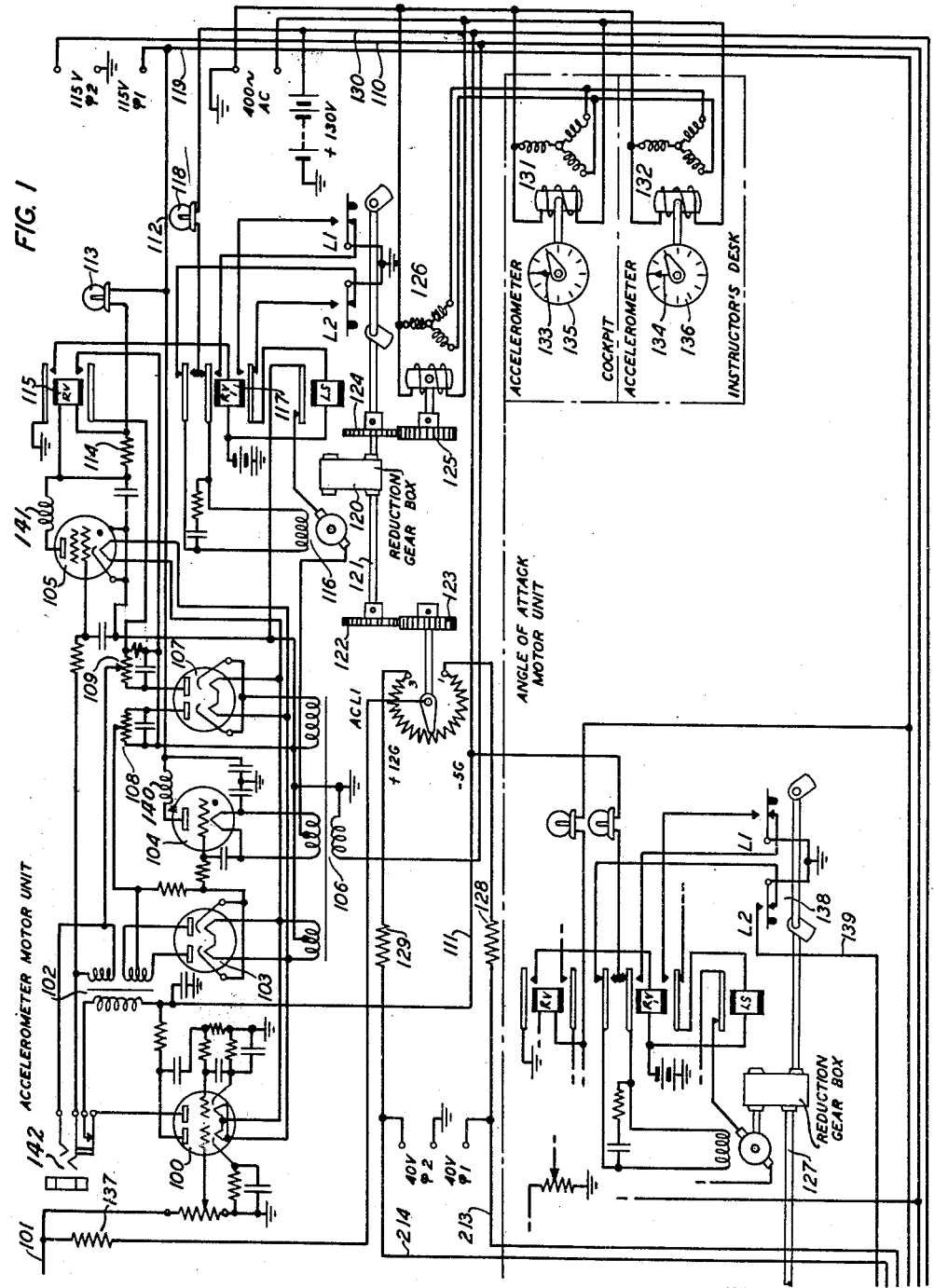

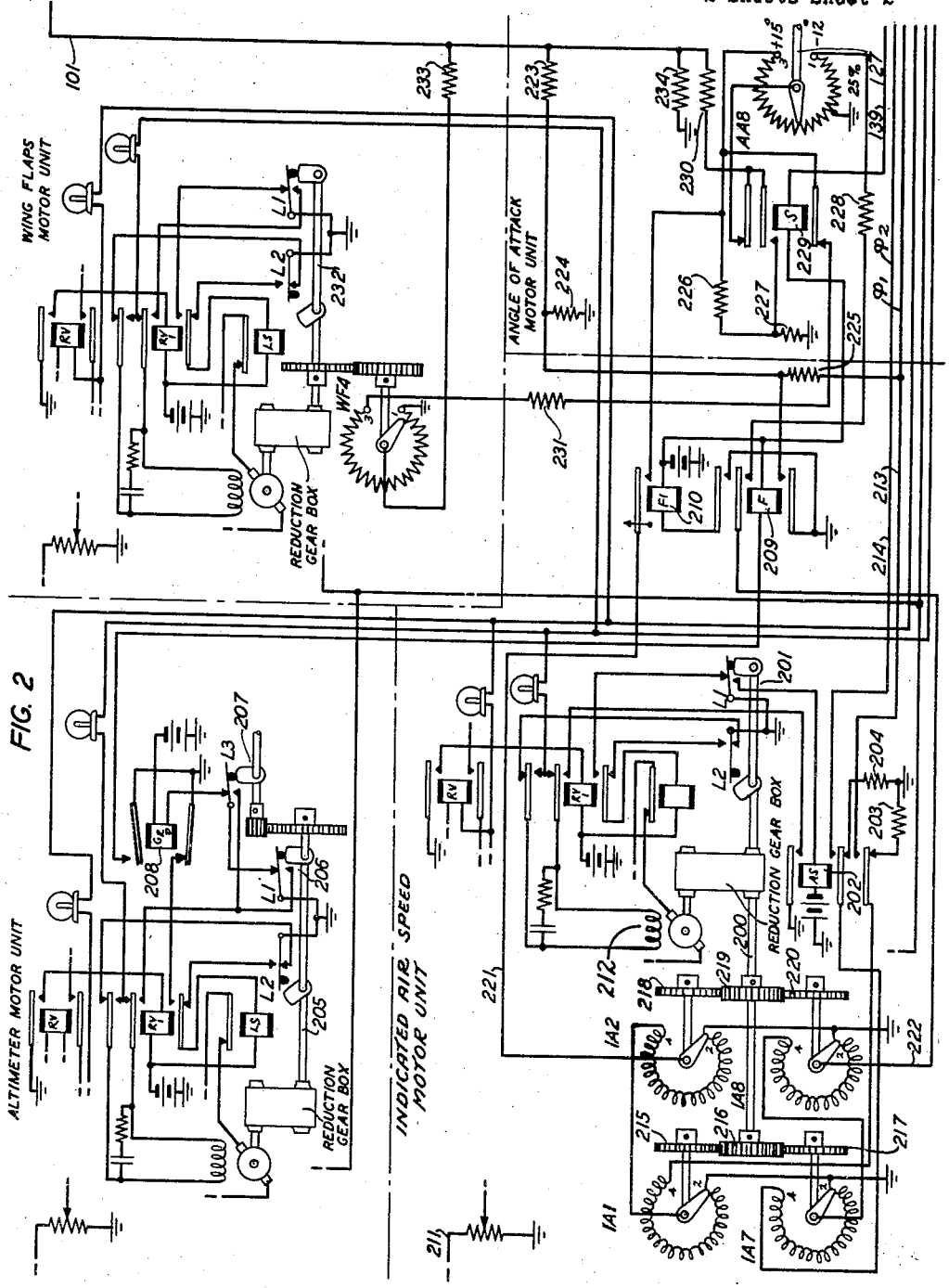

2,556,964

UNITED STATES PATENT OFFICE 2,556,964

GROUND TRAINER FOR AIRCRAFT PERSONNEL

Henry A. Giroud, New York, N. Y., assignor to Bell Telephone Laboratories Incorporated, New York, N. Y., a corporation of New York Application November 16, 1945, Serial No. 629,164

13 Claims. (Cl. 35—12)

This invention relates to a ground trainer for aircraft and more particularly to the simulation of the operation of the accelerometer of an airplane in response to flight operations.

The accelerometer of an airplane indicates only accelerations along the vertical axis of the airplane. The instrument does not indicate changes in velocity which take place in a line coinciding with the horizontal axes of the airplane.

The force along the vertical axis of the airplane is the product of the mass times the component of acceleration along said vertical axis ($F=ma$) and, since the mass of a loaded airplane may be considered substantially constant in any flight, the forces acting on the airplane may be expressed in terms of the accelerations affecting it. In maneuvering an airplane the largest changes in the accelerations affecting it are in the direction of its vertical axis. There is, in consequence, the greatest danger of exceeding the allowable stresses through excessive accelerations in the vertical axis direction.

At rest and in normal level flight, the force along the vertical axis of the airplane is due to its weight. Under such conditions the airplane is unaccelerated. However, the accelerometer indicates the force due to the mass of the acceleration responsive element of the instrument. For simplicity this force will be called the force due to gravitational acceleration. It is convenient to consider the magnitudes of all the other forces acting on the airplane in terms of multiples of the force due to the normal gravitational acceleration which is called the $g$ unit of acceleration and is defined by the equation $1g=32.2$ ft./sec.$^2$. Accelerometers are calibrated to read directly in $g$ units.

The positive direction of acceleration along the vertical axis is taken downwardly in the direction of the "gravitational acceleration" in normal flight. Thus the load supported by the wings in any maneuver is the product of the weight of the airplane by the accelerometer indication. The indicated acceleration along the vertical axis is therefore frequently referred to as the "load factor."

The maximum permissible values of acceleration over the speed range of a particular airplane are given in the operating diagrams for that airplane. The visual accelerometer is used by the pilot so that he may become familiar with the accelerations along the vertical axis characteristic of the airplane in various maneuvers so that maneuvers which would impose excessive loads on the airplane will not be executed. Accelerations along the vertical axis also are the ones having the greatest physical effects on the pilot: too great an acceleration causing the pilot to "black out."

The indications of the accelerometer also serve to show the accelerations imposed on an airplane by gusts and rough air in otherwise level flight. Thus it serves as an index to some of the stresses encountered under normal operating conditions.

In general, an accelerometer consists of a mass suspended for movement against the restraints of one or more calibrated springs. The weight of the mass is statically balanced by the tension of the spring or springs. A change in the acceleration acting on the mass causes it to move changing the tension of the spring or springs until the spring tension once more balances the force imposed (equal to the mass times the acceleration). The movement of the mass is communicated to a pointer or hand which, when the airplane is in level flight, indicates an acceleration of $+1g$ or a load on the airplane equal to the pull of gravity. The instrument may be calibrated to indicate a range which is from $-5g$ to $+12g$. The instrument is mounted in the airplane so that the mass moves in a plane parallel to the vertical axis of the airplane.

One form of instrument in general use comprises a mass slidable along two vertically disposed guide rods, the movement of the mass being communicated to the shaft on which the indicating hand of the instrument is mounted by a cord which is secured to the upper end of the mass, extends over an upper idler pulley is then wrapped around a driving pulley secured to the shaft, then extends around a lower idler pulley and is secured to the lower end of the mass. For restraining the movement of the mass, a helical spring surrounds the shaft having one of its ends secured to the shaft and the other of its ends attached to the casing of the instrument. When the vertical acceleration of the airplane changes the mass moves against the restraint of the helical spring and through the cord, converts its vertical movement into a rotary movement of the shaft. Normally the tension of the spring is such that the mass is held in a position such that, through the cord, the indicating hand is positioned to indicate an acceleration of $+1g$.

Most accelerometers have a maximum reading hand mounted on a hollow shaft surrounding the main shaft and driven from the main shaft by a pawl and ratchet mechanism when the main shaft is moved in a direction representative of a positive increase in acceleration. This hand moves simultaneously with the main or continuous reading hand up to the point of the highest +g reading. Then as the continuous reading hand returns to indicating whatever forces are currently being exerted on the airplane, the maximum reading hand is stopped at the highest indication to which it has been moved and retained by a retaining pawl which may be disengaged from the ratchel wheel to permit the maximum reading hand to be returned to normal by a suitable hair spring. Thus on any flight the maximum reading hand may be used to indicate the maximum plus value of g or the highest load factor imposed on the airplane. Some instruments are also provided with a third or minimum reading hand which is similarly positioned when the continuous reading hand is moved to positions indicative of minus values of g.

As an example of the operation of an accelerometer on a typical flight maneuver, when the airplane is climbing the accelerometer hand will indicate, for example, +2g until, when a suitable altitude is reached and the flight is leveled off, the instrument reading will become the normal or +1g. Should the airplane be nosed over to start a dive the accelerometer hand passes through zero g and goes to some value of −g as the angle of the dive becomes steeper. The hand will then swing back through zero g to +½g where it remains as the airplane inclines downward. When the pilot noses up sharply to stop the dive the greatest load on the wings is produced as will be indicated by a reading for example of +4g. During the pull out from the dive the accelerometer hand will indicate diminished values of +g until when the airplane levels off the hand of the instrument returns to the normal level flight indication of +1g.

It is desirable in a ground trainer for an airplane which is equipped with an accelerometer to give a student pilot training in the use of the accelerometer under flight conditions which he would encounter in flying an actual plane which the trainer simulates. To this end it is an object of the invention to simulate in a ground trainer the functioning of an accelerometer in response to the simulated maneuvering of an airplane.

It is a further object of the invention to provide in a ground trainer electrically controlled means for operating an accelerometer which means are responsive to the operation of the stick and engine controls of the trainer in simulation of the maneuvering of an airplane in flight.

To attain these objects the trainer is equipped with all of the engine and steering controls which would be a part of the equipment of the airplane which the trainer simulates. The trainer is furthermore provided with motor units which respond to these controls for establishing shaft positions representative of different flight conditions such as, for example, indicated air speed, angle of attack, altitude, wing flaps position, accelerometer, etc. Some of these motor units in addition to driving potentiometers and variable transformers from their shafts which enter into the control of other motor units of the trainer, also control the setting of instruments mounted on instrument panels of the trainer and duplicate instruments mounted on instrument panels at an instructor's desk. A trainer in which the circuits and apparatus responsive to the flight controls are completely illustrated is disclosed in the application of E. J. Fogarty and R. O. Rippere Serial No. 622,068, filed October 12, 1945.

To operate the accelerometer in the trainer, a standard type of accelerometer is modified by the removal of the movable mass, the driving connection therefrom to the shaft from which the instrument hands are driven, by the removal of the restraining spring or springs and by the connection of the rotor shaft of a synchro-receiver or so-called "autosyn" to the driving shaft of the instrument. For driving the synchro-receiver it is electrically connected with a similar synchro-transmitter the rotor of which is driven from an accelerometer motor unit.

The accelerometer motor unit is controlled by potentials representing the forces acting in the direction of the vertical axis of the airplane which the trainer simulates. Since it is usual, as previously stated, to consider the magnitude of accelerations acting on an airplane in terms of multiples of the normal gravitational acceleration, the load supported by the wings (lift) in any maneuver is the product of the weight of the airplane by the accelerometer indication or acceleration=lift/weight $$= \frac{KC_L V_i^2}{W} = K_1 C_L V_i^2$$

where $C_L$ is the coefficient of the lift of the wings, $V_i^2$ is the square of the indicated air speed, W is the weight of the airplane and $K_1$ is a constant determined by the division of the constant K by W.

In the trainer the term $C_L$, which is a function of the angle of attack and the position of the wing flaps, is determined by the movement of the slider of a potentiometer driven by the angle of attack motor unit, the term $V_i^2$ is determined by the movement of the sliders of variable transformers or "variacs" driven by the indicated air speed motor unit and the lift is also influenced in accordance with the simulated position of the wing flaps as represented by the position of the slider of a potentiometer driven by the wing flaps motor unit. In addition, a fixed potential is supplied which represents the gravitational force when the flight is assumed to be on the ground.

With an on-the-ground flight condition simulated by the trainer, a potential of phase $\varphi 1$ is applied to the control conductor of the accelerometer motor unit of sufficient value to cause the shaft of such unit to be rotated to a position representative of a normal or +1g position of the hands of the accelerometer resulting in the setting of the accelerometers to read +1g.

In the operation of the trainer, assuming that a flight condition is being simulated, an increase in the throttle opening causes the control of an R. P. M. motor unit to operate its shaft through positions representative of an increasing simulated engine speed thereby operating a potentiometer to control a thrust motor unit to operate its shaft into a position representative of an increase in the simulated thrust output. A thrust motor unit among other functions controls the indicated air speed motor unit to operate its shaft to a position representative of an increase in indicated air speed. With simulated indicated air speed and simulated thrust, the movement of the stick to operate an elevator potentiometer is effective to derive a controlling potential which is modified by potentiometers and variacs driven by the shaft of the indicated air speed motor unit and further modified by potentiometers and variacs driven by the shaft of the thrust motor unit, to operate the motor of an angle of attack motor unit. The motor of the angle of attack unit is also controlled by a potential which is varied in accordance with the simulated position of wing flaps as determined by the setting of the shaft of a motor unit in response to the operation of a simulated wing flaps control. In response to these control potentials, the motor of the angle of attack unit is operated to position its shaft into a position representative of the simulated angle of attack. The operations of the indicated air speed and angle of attack motor units are effective to control a motor unit whose shaft is driven representative of the angle of climb of the simulated flight. The shaft of the angle of climb motor unit drives potentiometers which are effective to control the altimeter motor unit. The shaft of this latter unit is thus operated representative of the altitude attained in the simulated flight. If the angle of attack increases to a greater positive value a potentiometer controlled by the angle of attack motor unit is effective to apply a phase $\varphi 1$ potential to the control conductor of the accelerometer motor unit. This potential is varied under the control of tandem-connected variacs driven by the shaft of the indicated air speed motor unit so that the potential applied to the control conductor of the accelerometer motor unit varies in accordance with the coefficient of lift as determined by the angle of attack potentiometer and in accordance with the square of the indicated air speed as determined by the indicated air speed variacs. This phase $\varphi 1$ potential will be instrumental in causing the accelerometer motor unit to operate the hands of the accelerometers in a direction representative of a positive value of vertical acceleration.

If the angle of attack changes to a negative value, the angle of attack potentiometer is effective to apply a phase $\varphi 2$ potential to the control conductor of the accelerometer motor unit which will be instrumental in causing the accelerometer motor unit to operate the hands of the accelerometers in a direction representative of a negative value of vertical acceleration. This potential is modified in accordance with the square of the indicated air speed by other tandem-connected variacs driven by the shaft of the indicated air speed motor unit.

Since the position of the wing flaps of an airplane will also influence the lift of the airplane in flight and will increase the lift as they are moved from their up to their down positions, this lift effect on the operation of the accelerometers is simulated in the trainer by a potential of phase $\varphi 1$ which is varied by the variacs driven by the indicated air speed motor unit in accordance with the square of the indicated air speed, and which potential is increased by a potentiometer driven from the shaft of the wing flaps motor unit. This potential will cause the motor of the accelerometer motor unit to drive the accelerometer hands in a direction representative of a positive value of vertical acceleration.

Since the accelerometer functions when the airplane is in flight, the potentials of phase $\varphi 1$ and phase $\varphi 2$ derived by the indicated air speed variacs, as previously described, are effective only when a flight is simulated. This is accomplished by a relay which is operated only when the shaft of the indicated air speed motor unit has moved from its zero air speed position and which relay when operated applies phase $\varphi 1$ and phase $\varphi 2$ potentials to the tandem connected indicated air speed variac previously referred to.

If the angle of attack is increased to such a value as would in an actual airplane cause a stall condition and loss of lift, a stall relay is operated in the trainer which removes the phase $\varphi 1$ lift potentials, as determined by the angle of attack potentiometer and wing flaps potentiometer, from the control conductor of the accelerometer motor unit and applies phase $\varphi 1$ potential to such control conductor of a value determined by the square of the indicated air speed. This potential is of less value than the sum of the phase $\varphi 1$ potentials applied to the control conductor prior to the simulation of the stall condition and therefore the accelerometer motor unit is operable to cause the accelerometers to show reduced positive readings.

During a simulated flight the phase $\varphi 1$ and phase $\varphi 2$ potentials derived at the indicated air speed variacs and selectively applied to the control conductor of the accelerometer motor unit in accordance with the setting of the slider of the angle of attack potentiometer, and the phase $\varphi 1$ potential applied under the control of the wing flaps potentiometer, are made effective by the operation of first and second flight relays which operate as soon as the shaft of the altimeter motor unit moves from its zero altitude position. One of these relays upon operating is also effective to render the application of the normally applied phase $\varphi 1$ potential to the control conductor of the accelerometer motor unit ineffective during flight. When, however, a landing is made the latter relay releases at once to render this potential again effective and the other flight relay which is rendered slow to release maintains phase $\varphi 1$ potential of values determined by the indicated air speed variacs and by the angle of attack and wing flaps potentiometers applied to the control conductor. These phase $\varphi 1$ potentials are thus additive until the second flight relay releases to cause a momentary positive increase in the readings of the accelerometers representative of the jolt delivered to the accelerometers due to landing.

The features of the trainer by which the foregoing control of the accelerometers is accomplished having been briefly described reference may now be had, for a more comprehensive understanding of the invention, to the following detailed description when read in connection with the accompanying drawings in which:

Fig. 1 shows above the dot-dash line the accelerometer motor unit, shows in the boxes in the right portion of the figure the schematic representation of the accelerometers on the pilot's instrument panel and on the instrument panel at the instructor's desk, and in the lower left portion of the figure a schematic representation of a portion of the angle of attack motor unit; and Fig. 2 shows in the lower right portion thereof a potentiometer driven by the angle of attack motor unit of Fig. 1, in the lower left portion thereof the schematic representation of such portions of the indicated air speed motor unit as are necessary for an understanding of the present invention, in the upper left portion thereof a schematic representation of such portions of the altimeter motor unit as are concerned with the present invention and in the upper right portion thereof the schematic representation of such portions of the wing flaps motor unit as are concerned with the present invention.

For a complete disclosure of the invention Fig. 1 should be positioned to the right of Fig. 2.

The accelerometer motor unit disclosed in the upper portion of Fig. 1 is of the type disclosed and fully described in Patent No. 2,428,767 granted to Albert-Davis-Gumley-Holden on October 14, 1947.

It includes a direct current reversible type motor 116 whose stator winding is energized by direct current from the +130-volt bus bar 130 through the lamp resistance 118 under the control of the RV1 reversing relay 117, which relay is in turn under the control of the plate relay 115 associated with the gas-filled tube 105. The rotor winding of the motor is energized by positive impulses of current transmitted therethrough by the firing of the gas-filled tube 104. The motor, through the reduction gear box 120, rotates the shaft 121 which shaft, through gears 122 and 123, turns the slider of the balancing potentiometer ACL1 and through gears 124 and 125 turns the rotor of the synchro-transmitter 126.

In general the circuit for controlling the motor 116 comprises a dual triode amplifier tube 100 which receives a signal incoming on signal control conductor 101, amplifies it, and applies it through the step-up transformer 102 to the plates of the dual diode rectifier tube 103. The tube 103 serves as a full wave rectifier to rectify the output signal from the tube 100 and to apply it as a positive potential to the grid of the gas-filled tube 104. The output potential from tube 100 is also applied through the upper secondary winding of transformer 102 to the control grid of the gas-filled tube 105. Direct current for providing grid biases to the control grids of tubes 104 and 105 is supplied from the right secondary winding of power transformer 106 through the dual diode rectifier tube 107 under the control of the grid bias control rheostats 108 and 109. Filament heating current for all the tubes is supplied from the other secondary windings of the power transformer 106, the primary winding of which is energized from the 115-volt bus bar 110. Plate potential is supplied to the plates of the amplifier tube 100 over conductor 111 from the +130-volt bus bar 130 and 60-cycle plate potential is applied from the 115-volt phase $\phi$1 bus bar 119 over conductor 112 and choke coil 140 to the plate of tube 104 and through resistance lamp 113 and thence in parallel through resistance 114 and the winding of the RV relay 115 and choke coil 141 to the plate of tube 105. The RV relay 115 in addition to controlling the circuit of the RV1 relay 117 establishes over its lower contacts a short circuit of the resistance in series with the biasing circuit of tube 105 to increase the positive bias of such tube thereby insuring that relay 115 will be held operated so long as tube 105 continues to conduct in response to an incoming signal potential.

The jack 142 is provided to enable the motor control circuit to be tested for correct operation. To prevent the motor 116 from rotating the shaft 121 to such a position that the slider of potentiometer ACL1 might be driven off either end of the potentiometer winding, the limit switches L1 and L2 are provided either of which when operated opens the stator circuit of the motor 116 and closes the circuit of relay LS which upon operating opens the rotor circuit of the motor to arrest further rotation of the motor.

When the input signal potential applied to conductor 101 is in phase with the potential applied to the plate of tube 105, relays 115 and 117 will operate and, since the rectifier tube 103 functions to make the grid of tube 104 more positive in response to both half waves of the signal regardless of the phase of the signal with respect to the phase of the potential applied to the plate of tube 104, the tube 104 will cause the transmission of an impulse through the rotor circuit of the motor 116 each time the tube 104 fires on each positive half wave of the plate potential and the motor will run in one direction. In response to an input signal which is out of phase with the potential applied to the plate of tube 105, tube 105 will not conduct and consequently relays 115 and 117 will not operate but, since tube 104 will fire on each positive half wave of the potential applied to its plate, the motor 116 will be operated in response to the incoming signal in the reverse direction of rotation.

The altimeter, indicated air speed, angle of attack, and wing flaps motor units shown schematically in Figs. 1 and 2 are similar to the accelerometer motor unit but to avoid increasing the disclosure unnecessarily they have been abbreviated to show only the input circuits of the first amplifier tubes thereof, to show the RV, RV1 and LS relays which control the circuits of the motors and to show the motor reduction gear boxes and limit switches.

To prepare the trainer for the simulation of a flight, the engine controls are operated to cause the simulation of the operation of the engine resulting in the simulated development of thrust and the control of the indicated air speed motor unit of Fig. 2 representative of the simulated development of air speed as set forth in the application of E. J. Fogarty and R. O. Rippere hereinbefore referred to and as briefly described hereinbefore. Until the unchocking of the landing gear wheels is simulated no indicated air speed will be developed and the shaft 200 of the indicated air speed motor unit will be in a position representative of zero air speed in which position the L1 limit switch 201 will be operated to the alternate position and the AS relay 202 will be unoperated. With relay 202 unoperated the winding of the indicated air speed variac IA1 will be connected into a circuit extending from ground therethrough and over the lower back contact of relay 202 to ground through resistor 203 and the winding of the indicated air speed variac IA7 will be connected into a circuit extending from ground therethrough and over the inner lower back contact of relay 202 to ground through resistor 204 to discharge the windings of the variacs.

At this time the shaft 205 of the altimeter motor unit will be in a position representative of zero altitude in which position the L1 and L3 limit switches 206 and 207 will be operated to their alternate positions in which a circuit is established from ground over the alternate contacts of such switches and through the winding of the GRD relay 208 to battery and ground. Relay 208 is thus operated and remains operated until the limit swtich 207 releases when the simulated flight becomes airborne. So long as relay 208 remains operated the F and F1 flight relays 209 and 210 cannot operate.

At this time the shaft 127 of the angle of attack motor unit will be in a position representative of about a +8-degree angle of attack such as would be the case with all of the landing gear wheels on the ground or flight deck of a carrier.

When the simulation of the removal of the wheel chocks has been made a potential is applied to the control conductor 211 of the indicated air speed motor unit of a phase which causes the motor 212 of such unit to turn shaft 200 in a direction representative of the development of air speed as the simulated flight moves over the ground. As soon as indicated air speed is developed, shaft 201 permits the L1 limit switch to restore thereby establishing the obvious circuit for the AS relay 202 which thereupon operates, opening the discharge circuits of the variacs IA1 and IA7 and connecting the winding of variac IA1 over the lower front contact of relay 202 to bus bar 213 to which 40-volt phase $\varphi1$ potential is applied, and connecting the winding of variac IA7 over the inner lower front contact of relay 202 to bus bar 214 to which 40-volt phase $\varphi2$ potential is applied.

The windings of these variacs now become energized and as the sliders thereof are driven by shaft 200 through the gears 215, 216, and 217 from the No. 2 terminals toward the No. 4 terminals of their windings as the simulated indicated air speed increases, increasing potentials of phase $\varphi1$ and phase $\varphi2$ are derived at such sliders and applied through the windings of variacs IA2 and IA8, respectively. The sliders of the latter variacs are also driven through the gears 218, 219 and 220 in correspondence with the movement of the sliders of variacs IA1 and IA7, and potentials of phase $\varphi1$ and phase $\varphi2$ are therefore derived at their sliders respectively and applied to conductors 221 and 222. Since the variacs IA1 and IA2 are connected in tandem, the potential of phase $\varphi1$ applied to conductor 221 will vary in accordance with the square of the simulated indicated air speed and similarly since the variacs IA7 and IA8 are connected in tandem the potential of phase $\varphi2$ applied to conductor 222 will also vary in accordance with the square of the simulated air speed. These derived potentials, however, are not effective until an airborne or flight condition is simulated and the F and F1 relays 209 and 210 become operated.

Until the F relay 209 operates, potential of phase $\varphi1$ is applied through resistor 223 to control conductor 101 of the accelerometer motor unit. This potential is derived at the junction point between resistors 224 and 225 which constitute a potential divider extending from the phase $\varphi1$ bus bar 213 through such resistors to ground. This potential of phase $\varphi1$ applied to conductor 101 is such as to cause the motor 116 of the accelerometer motor unit to rotate shaft 121 in a direction representative of a positive increase in the vertical acceleration. As the shaft rotates the slider of balancing potentiometer ACL1 is driven by the gears 122 and 123 toward the No. 3 terminal of its winding. This winding has its No. 1 terminal connected through a resistor 128 of 2200 ohms to the phase $\varphi1$ bus bar 213 and has its No. 3 terminal connected through a resistor 129 of 1425 ohms to the phase $\varphi2$ bus bar 214 and normally the slider is positioned so that the potentials of phase $\varphi1$ and phase $\varphi2$, which are 180 degrees out of phase, applied thereto at its point of engagement with the winding will be balanced. In this position the shaft 121, through the gears 124 and 125, will have rotated the rotor of synchro-transmitter 126 to a position in which the synchro-receivers 131 and 132 controlled thereby are operated into positions in which the indicating hands 133 and 134 of the accelerometers 135 and 136 at the pilot's pedestal and at the instructor's desk will indicate $0g$.

As the slider of potentiometer ACL1 moves toward the No. 3 terminal of its winding in response to the application of potential of phase $\varphi1$ to control conductor 101 an increasing preponderance of potential of phase $\varphi2$ will appear on the slider and will be applied through resistor 137 to control conductor 101 until this potential balances the potential of phase $\varphi1$ applied to such conductor. The motor 116 will then stop. The movement of the rotor of synchro-transmitter 126 through the rotation of shaft 121 will now have controlled the synchro-receivers 131 and 132 to set the hands 133 and 134 of the accelerometers 135 and 136 to indicate the normal "gravitational acceleration" of $+1g$.

When sufficient indicated air speed has been attained enough simulated lift will be developed to represent an airborne condition of flight. As soon as this condition is simulated the shaft 205 of the altimeter motor unit will rotate in such a direction as to release the L1 and L3 limit switches 206 and 207 thereby releasing the GRD relay 208 and permitting the F and F1 flight relays 209 and 210 to operate. With these relays operated conductor 221 is connected over the contacts of relay 210 through the potential divider comprising resistors 226 and 227 to ground and in parallel therewith through the upper 75 per cent of the winding of the angle of attack potentiometer AA8 to ground. Conductor 222 is also connected over the inner upper front contact of relay 209, through resistor 228, and through the lower 25 per cent of the winding of potentiometer AA8 to ground. The angle of attack at the time of simulated take-off will be positive and consequently the slider of potentiometer AA8 will be positioned between the ground tap and the No. 3 terminal of the potentiometer winding and a potential of phase $\varphi1$ will be applied from such slider over the upper back contact of the stall (S) relay 229 and through resistor 230 to control conductor 101 of the accelerometer motor unit. This potential will therefore vary as the square of the indicated air speed as determined by the variacs IA1 and IA2 and will also vary directly as the angle of attack and is a measure of the lift.

Potential of phase $\varphi1$ applied to conductor 221 is also applied over the contacts of relay 210, over the lower back contact of the S relay 229, through resistor 231 and through the winding of the wing flaps potentiometer WF4 for energizing such winding. But with the wing flaps assumed to be in the up position represented by the position of shaft 232 of the wing flaps motor unit and the position of the slider of the potentiometer WF4 at the No. 1 or ground terminal of its winding, no potential of phase $\varphi1$ is applied from such slider through resistor 233 to control conductor 101 of the accelerometer motor unit.

With relay 209 now operated direct ground is connected over the lower contacts of relay 209 and through resistor 223 to control conductor 101 and the phase $\varphi1$ potential normally applied through resistor 223 to control the accelerometer motor unit to set the hands of accelerometers 135 and 136 to their $+1g$ positions is no longer effective. However, the phase $\varphi1$ potential applied through resistor 230 is now effective and as the student pilot moves back the stick of the trainer to execute a climbing maneuver and the angle of attack consequently increases, the phase $\varphi1$ potential applied through resistor 230 increases due to the movement of the slider of potentiometer AA8 toward the No. 3 terminal of its winding and further increases in accordance with the square of the indicated air speed as the throttle is opened.

This phase $\varphi1$ potential will cause the motor 116 of the accelerometer motor unit to move the shaft 121 in a direction representative of an increase in the vertical acceleration until the slider of balancing potentiometer ACL1 has been moved sufficiently toward the No. 3 terminal of its winding to apply a phase φ2 potential to control conductor 101 which balances the phase φ1 potential applied thereto through resistor 230 whereupon the motor will stop. As the result of the rotation of shaft 121 the synchro-transmitter 126 is operated to drive the synchro-receivers 131 and 132 in a direction representative of an increase in acceleration which will be indicated by the accelerometers 135 and 136. It will be assumed that for the simulated climbing maneuver the accelerometers will indicate a vertical acceleration of, for example, +2g.

When the simulated flight has attained a desired altitude, the student pilot pushes back on the stick thereby causing a reduction in the angle of attack and the leveling off of the flight. The reduction in the angle of attack causes a reduction in the phase φ1 potential applied through resistor 230 to control conductor 101. The potential of phase φ2 now applied to conductor 101 from the slider of the balancing potentiometer ACL1 of the accelerometer motor unit will be greater than the potential of phase φ1 and as a consequence the motor 116 will be operated to drive the shaft 121 in a direction representative of a reduction in acceleration. The rotation of the shaft 121 will now move the slider of potentiometer ACL1 back toward the No. 1 terminal of its winding thereby reducing the phase φ2 potential applied from such slider to control conductor 101 until it balances the phase φ1 potential whereupon the motor will stop. Through this movement of shaft 121 the synchro-transmitter 126 is operated and through the synchro-receivers 131 and 132 driven thereby the accelerometers 135 and 136 are adjusted to show a reduction in vertical acceleration to the level flight readings of +1g.

It will now be assumed that the student pilot pushes the stick forward to simulate a nosing down of the simulated flight. In response to this operation of the stick the angle of attack is changed from a positive to a negative value and the slider of the angle of attack potentiometer AA8 is moved to a position between the ground tap and the No. 1 terminal of its winding. The potential now applied from the slider of such potentiometer over the upper back contact of relay 229, through resistor 230, to control conductor 101 of the accelerometer motor unit changes from phase φ1 to phase φ2, the value of which phase φ2 potential increases as the angle of attack increases in a negative direction and which also increases in accordance with the square of the indicated air speed as determined by the indicated air speed variacs IA7 and IA8.

With potential of phase φ2 applied to control conductor 101 through resistor 230, the motor 116 of the accelerometer motor unit now rotates the shaft 121 in a direction representative of a change from a positive to a negative value of acceleration. As the shaft 121 rotates the slider of balancing potentiometer ACL1 is moved towards the No. 1 terminal of its winding until a potential of phase φ1 is applied from the slider to control conductor 101 which balances the phase φ2 potential applied to such conductor through resistor 230 whereupon the motor will stop. Through the movement of shaft 121, the synchro-transmitter 126 is operated and, through the synchro-receivers 131 and 132 driven thereby, the hands 133 and 134 of the accelerometers 135 and 136 are moved in a counter-clockwise direction through their zero positions to −g positions as, for example, to −1g.

As the steepness of the dive increases the angle of attack changes from a negative to a positive value and with the slider of the angle of attack potentiometer AA8 now positioned on the No. 3 terminal side of the ground tap, the potential applied from such slider becomes of phase φ1 and increases as the indicated air speed of the dive increases. This potential applied to control conductor 101 of the accelerometer motor unit causes the motor thereof to rotate shaft 121 to a position representative of a change from a negative value of g to a positive value of g as will be indicated by the hands 133 and 134 of the accelerometers 135 and 136. It will be assumed that as the speed of the dive increases the accelerometers become set to indicate an acceleration of, for example, +½g.

When the pilot pulls back on the stick to cause a sharp nosing up of the flight to stop the dive, the angle of attack is increased in a positive direction whereupon the slider of potentiometer AA8 is moved further toward the No. 3 terminal of its winding thereby increasing the potential of phase φ1 applied through resistor 230 to control conductor 101 and controlling the motor 116 of the accelerometer motor unit to rotate shaft 121 in a direction representative of an increase in vertical acceleration. Under this condition of nosing up out of a power dive the greatest load on an airplane is produced. In the trainer this will appear as a marked increase in the +g settings of the hands of the accelerometers 135 and 136 as the shaft 121 is rotated. It will be assumed that for the simulated dive the accelerometers will show readings of +4g at the time of the pull out.

As the flight noses up after the pull out, the indicated air speed drops and the value of the phase φ1 potential applied from the slider of angle of attack potentiometer AA8 decreases whereupon the preponderance of phase φ2 potential applied to control conductor 101 from the slider of the balancing potentiometer ACL1 of the accelerometer motor unit is effective to cause the shaft 121 to be rotated in a direction representative of a gradual decrease in vertical acceleration from the maximum reading of +4g to the normal level flight reading of +1g when the pilot again levels the flight off.

If in the simulation of a climbing maneuver the angle of attack is increased to the maximum or about +15 degrees, the L2 limit switch 138 driven by the shaft 127 of the angle of attack motor unit will be moved to its alternate position thereby establishing a circuit from ground, over the contacts of such switch, over conductor 139 and to battery and ground through the winding of the stall (S) relay 229. With this relay operated, the phase φ1 potential applied over its upper back contact from the slider of the angle of attack potentiometer AA8, through resistor 230, to control conductor 101 is discontinued and potential of phase φ1 is applied from the junction point between resistors 226 and 227 of the potential divider comprising such resistors, thence over the front contact of relay 229 and through resistor 230 to control conductor 101. This potential is of less value than the potential previously applied and causes the accelerometer motor unit to operate the accelerometer to show reduced readings representative of the reduction in lift during the stall condition.

The stall relay 229 upon operating will also discontinue the application of the lift potential of phase φ1 applied from the slider of the wing flaps potentiometer WF4, this being accomplished by the opening of the circuit at the lower back contact of relay 229 over which phase φ1 potential is applied to energize the winding of potentiometer WF4.

In making a landing the stick is pulled back whereupon the angle of attack is increased, the throttle is partially closed thereby causing a reduction in the indicated air speed, and the wing flaps control is operated to the down position whereupon the shaft 232 of the wing flaps motor unit is rotated to a position representative of the movement of the wing flaps to their down position, in which position the slider of the wing flaps potentiometer WF4 will be at the No. 3 terminal of its winding. With the slider of the wing flaps potentiometer WF4 so positioned, potential of phase φ1 is applied to control conductor 101 of the accelerometer motor unit through resistor 233, which potential will vary as the square of the indicated air speed as determined by the indicated air speed variacs IA1 and IA2. At the same time potential of phase φ1 is also applied to control conductor 101 through resistor 230 which varies as the angle of attack as determined by the angle of attack potentiometer AA8 and as the square of the indicated air speed as determined by the variacs IA1 and IA2. The sum of these potentials, however, due to the reduced indicated air speed will be such as to cause the accelerometer motor unit to hold the readings of the accelerometers at about $+1g$.

As soon as the altimeter reading reaches zero the L1 and L3 limit switches 206 and 207 of the altimeter motor unit operate to their alternate positions thereby causing the reoperation of the GRD relay 208 and the release of the F and F1 relays 209 and 210. Relay 209 upon releasing again renders the application of phase φ1 potential effective from the potential divider comprising resistors 224 and 225, through resistor 223 to control conductor 101, and relay 210 which is slow to release maintains the application of phase φ1 potential from conductor 221, over the contacts of relay 210 and thence as previously traced over the slider of angle of attack potentiometer AA8, through resistor 230, to control conductor 101 and over the slider of the wing flaps potentiometer WF4 through resistor 233 to control conductor 101. Thus during the releasing time of relay 210 the augmented potential of phase φ1 applied to the control conductor of the accelerometer motor control unit is effective to cause the shaft 121 to make a quick movement in a direction representative of an increase in vertical acceleration which is indicated by increased readings of the accelerometers. As soon as relay 210 releases this augmented potential of phase φ1 is reduced to the potential applied through resistor 223 or the potential representative of the normal or "gravitational acceleration" condition whereupon the motor unit is operated under the control of the balancing potentiometer ACL1 to return the shaft 121 to a position representative of $+1g$ acceleration which will then be indicated by the accelerometers. This fluctuation of the hands of the accelerometers simulates the increase in readings which would result from the jolt of landing.

The resistor 234 of 5,000 ohms resistance is connected from control conductor 101 to ground thereby placing a low resistance across the accelerometer motor unit input in order to reduce the effects of the accelerating forces applied through resistors 223, 230 and 233.

What is claimed is:

1. In an aircraft trainer wherein the flight operations of an airplane are simulated, a source of current, means for deriving a potential from said source commensurate with the simulated gravitational acceleration, means for rendering said potential effective when an on-the-ground condition of flight is simulated, a simulated accelerometer, and means responsive to said potential for adjusting said accelerometer to show a reading of $+1g$ representative of the normal vertical acceleration due to the gravitational force.

2. In an aircraft trainer wherein the flight operations of an airplane are simulated, a source of current, a control conductor, means for deriving a potential from said source commensurate with the simulated gravitational acceleration, means for applying said potential to said conductor when an on-the-ground condition of flight is simulated, a balancing potentiometer for deriving a potential from said source opposite in phase to said first potential and for applying it to said conductor, a motor responsive to the summation of the potentials applied to said conductor for adjusting said potentiometer until the sum of the potentials applied to said conductor becomes zero, a simulated accelerometer operable by said motor to show a reading of $+1g$ representative of the normal vertical acceleration due to the gravitational force when said balancing potentiometer has applied a potential to said conductor which balances said first potential.

3. In an aircraft trainer wherein the flight operations of an airplane are simulated, a source of current, means for deriving a potential from said source which varies in accordance with the square of the simulated indicated air speed of the simulated flight, means for rendering said potential effective when an airborne condition of flight is simulated, means for modifying said potential when thus rendered effective in accordance with the simulated angle of attack of the simulated flight, said latter potential having a value commensurate with the simulated gravitational acceleration when the indicated air speed and the angle of attack are adjusted to simulate a level and straight flight, a simulated accelerometer, and means responsive to said modified potential for adjusting said accelerometer to show a reading of $+1g$ representative of the normal vertical acceleration due to gravitational force.

4. In an aircraft trainer wherein the flight operations of an airplane are simulated, a source of current, two tandem connected rotary transformers for deriving a first potential from said source which varies in accordance with the square of the simulated indicated air speed of the simulated flight, a potentiometer for modifying said potential in accordance with the simulated angle of attack of the simulated flight, means operable to simulate an airborne condition of flight, a relay controlled by said means for rendering said first potential effective, said modified potential having a value commensurate with the simulated gravitational acceleration when the indicated air speed and the angle of attack are adjusted to simulate a level and straight flight course, a simulated accelerometer, and means responsive to said modified potential for adjusting said accelerometer to show a reading of $+1g$ representative of the normal vertical acceleration due to gravitational force.

5. In an aircraft trainer wherein the flight operations of an airplane are simulated, a source of current, a control conductor, means for deriving a potential from said source which varies in accordance with the square of the simulated indicated air speed of the simulated flight, means for rendering said potential applicable to said conductor when an airborne condition of flight is simulated, means for modifying said derived potential in accordance with the simulated angle of attack of the simulated flight, said latter potential having a value commensurate with the simulated gravitational acceleration when the indicated air speed and the angle of attack are adjusted to simulate a level and straight flight course, a balancing potentiometer for deriving a potential from said source opposite in phase to said latter potential and for applying it to said conductor, a motor responsive to the summation of the potentials applied to said conductor for adjusting said potentiometer until the sum of the potentials applied to said conductor becomes zero, and a simulated accelerometer operable by said motor to show a reading of $+1g$ representative of the normal vertical acceleration due to gravitational force.

6. In an aircraft trainer wherein the flight operations of an airplane are simulated, means for simulating the indicated air speed of a simulated flight, means for simulating the angle of attack of a simulated flight, a source of current, means controlled by said air speed simulating means for deriving potentials of opposite phase from said source which vary in accordance with the square of the simulated indicated air speed of the simulated flight, means controlled by said angle of attack simulating means for modifying one of said potentials in accordance with a positive value of the simulated angle of attack of the simulated flight, means controlled by said angle of attack simulating means for modifying the other of said potentials in accordance with a negative value of the angle of attack of the simulated flight, and simulated accelerometer, and means responsive to said modified potentials for adjusting said accelerometer to show a positive or negative value of the vertical acceleration of the simulated flight dependent upon the positive or negative value of the angle of attack.

7. In an aircraft trainer wherein the flight operations of an airplane are simulated, a source of current, means for deriving first and second potentials of opposite phase from said source which vary in accordance with the square of the simulated indicated air speed of the simulated flight, a potentiometer for modifying the first of said derived potentials in accordance with a positive value of the simulated angle of attack of the simulated flight, means for modifying the second of said potentials in accordance with a negative value of the simulated angle of attack of the simulated flight, a simulated accelerometer, and means responsive to the first modified potential of one phase when the angle of attack is varied from a level flight angle over positive values for adjusting said accelerometer to show a varying positive value of the simulated vertical acceleration of the simulated flight, and responsive to the modified first potential of the same phase and then to the modified second potential of the opposite phase when the angle of attack is varied from a level flight angle over declining positive values and thereafter over increasing negative values for adjusting said accelerometer to show a value of simulated vertical acceleration which varies from a normal $+1g$ value through a zero value to a minus value.

8. In an aircraft trainer wherein the flight operations of an airplane are simulated, a source of current, a control conductor, a first pair of tandem connected rotary transformers for deriving a first potential of one phase from said source which varies in accordance with the square of the simulated indicated air speed of the simulated flight, a second pair of tandem connected rotary transformers for deriving a second potential opposite in phase to said first potential which varies in accordance with the square of the simulated indicated air speed of the simulated flight, means operative when an airborne condition of flight is being simulated for rendering said potentials effective, a potentiometer for modifying one of said potentials in accordance with a positive value and the other of said potentials in accordance with a negative value of the simulated angle of attack of the simulated flight and for applying such modified potential to said conductor, a balancing potentiometer for deriving a potential opposite in phase to the modified potential applied to said conductor and for applying it to said conductor, a motor responsive to the summation of the potentials applied to said conductor for adjusting said balancing potentiometer until the sum of the potentials applied to said conductor becomes zero, and simulated accelerometer controlled by said motor to show a varying positive value of the simulated vertical acceleration of the simulated flight when the angle of attack is varied from a level flight angle over positive values and to show a value of simulated vertical acceleration which varies from a normal $+1g$ value through a zero value to a minus value when the angle of attack is varied from a level flight angle over declining positive values and thereafter over increasing negative values.

9. In an aircraft trainer wherein the flight operations of an airplane are simulated, a source of current, a control conductor, means for deriving a first and a second potential of opposite phases from said source which vary in accordance with the square of the simulated indicated air speed of the simulated flight, means operative when an airborne condition of flight is being simulated for rendering said potentials effective, means for modifying said first potential in accordance with the simulated position of wing flaps, a potentiometer for modifying the first of said derived potentials in accordance with a positive value of the second of said derived potentials in accordance with a negative value of the simulated angle of attack of the simulated flight, means for selectively applying said modified potentials to said conductor, a motor responsive to the summation of the potentials applied to said conductor which are representative of the simulated lift of the simulated flight, and a simulated accelerometer controlled by said motor to show the current value of the simulated vertical acceleration of the simulated flight as determined by the value of said lift.

10. In an aircraft trainer wherein the flight operations of an airplane are simulated, a source of current, means for simulating the angle of attack of a simulated flight means operated by said first means for deriving a potential from said source which varies in accordance with the simulated lift of a simulated airplane, means controlled by said first means for reducing said potential to a value representative of the reduced value of lift when a stall condition of flight is simulated, a motor responsive to said potential and a simulated accelerometer controlled by said motor to show the current value of the simulated vertical acceleration of the simulated flight as determined by the value of the simulated lift.

11. In an aircraft trainer wherein the flight operations of an airplane are simulated, a source of current, a control conductor, means for deriving a first and a second potential of opposite phases from said source which vary in accordance with the square of the simulated indicated air speed of the simulated flight, a potentiometer for modifying one of said derived potentials in accordance with a positive value and the other of said derived potentials in accordance with a negative value of the simulated angle of attack of the simulated flight, means for modifying said first potential in accordance with the simulated position of wing flaps, a relay effective when unoperated to enable said modified potentials to be selectively applied to said conductor, a motor responsive to the summation of the potentials applied to said conductor which are representative of the simulated lift of the simulated flight, a simulated accelerometer controlled by said motor to show the current value of the simulated vertical acceleration of the simulated flight as determined by the value of said lift, means for modifying said first potential to produce a potential representative of the reduced lift when a stall condition is simulated, and means for operating said relay to discontinue the application of said potentials modified in accordance with the simulated angle of attack and with the simulated position of the wing flaps to said conductor and to apply said potential representative of the reduced lift when a stall condition is simulated to said conductor whereby said accelerometer is controlled to show a reduced acceleration due to the stall condition.

12. In an aircraft trainer wherein the flight operations of an airplane are simulated, a source of current, means for deriving a potential from said source which varies in accordance with the simulated lift of a simulated airplane, means for deriving a potential from said source commensurate with the simulated normal gravitational force applied to the simulated airplane, means for momentarily rendering both of said potentials effective when the landing of a simulated flight is simulated, a motor responsive to the summation of said potentials, and a simulated accelerometer controlled by said motor to show the current value of the simulated vertical acceleration of the simulated flight, said motor causing said accelerometer to show a sudden momentary increase in acceleration in response to said latter means representative of the effect on the accelerometer due to the jolt of landing.

13. In an aircraft trainer wherein the flight operations of an airplane are simulated, a source of current, a control conductor, means for deriving a potential from said source which varies in accordance with the square of the simulated indicated air speed of the simulated flight, a first and a second relay operable in cascade for rendering said derived potential effective when an airborne flight condition is being simulated, a potentiometer for producing from said derived potential a first potential which varies in accordance with the simulated angle of attack of the simulated flight, means for producing from said derived potential a second potential which varies in accordance with the simulated position of wing flaps, means for deriving a third potential from said source and applying it to said conductor when said first relay is released representative of a landing, a balancing potentiometer for deriving a potential from said source opposite in phase to said other potentials and for applying it to said conductor, a motor responsive to the summation of the potentials applied to said conductor for adjusting said balancing potentiometer until the sum of the potentials applied to said conductor becomes zero, and a simulated accelerometer controllable by said motor, said second relay being slow to release following the release of said first relay when a landing is simulated whereby said first and second potentials are momentarily added to said third potential to momentarily increase the reading of said accelerometer at the moment of landing.

HENRY A. GIROUD.

REFERENCES CITED

The following references are of record in the file of this patent:

UNITED STATES PATENTS

| Number | Name | Date |
| --- | --- | --- |
| 2,366,603 | Dehmel | Jan. 2, 1945 |
| 2,395,477 | Gumley | Feb. 26, 1946 |
| 2,406,221 | Hornfeck | Aug. 20, 1946 |
| 2,475,314 | Dehmel | July 5, 1949 |